US012231985B2

United States Patent
Archbold et al.

(10) Patent No.: US 12,231,985 B2
(45) Date of Patent: Feb. 18, 2025

(54) METHOD AND APPARATUS FOR LOCATION-BASED, AUTOMATED CONTROL OF ELECTRONIC DEVICES

(71) Applicant: ECOLINK INTELLIGENT TECHNOLOGY, INC., Carlsbad, CA (US)

(72) Inventors: Michael Archbold, Carlsbad, CA (US); Paul D. Arling, Scottsdale, AZ (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 385 days.

(21) Appl. No.: 17/715,726

(22) Filed: Apr. 7, 2022

(65) Prior Publication Data

US 2023/0328476 A1    Oct. 12, 2023

(51) Int. Cl.
| | | |
|---|---|---|
| *H04W 4/80* | (2018.01) | |
| *G07C 9/00* | (2020.01) | |
| *H04L 12/28* | (2006.01) | |
| *H04W 4/02* | (2018.01) | |
| *H04W 4/021* | (2018.01) | |
| *H04W 12/50* | (2021.01) | |
| *H04W 84/12* | (2009.01) | |

(52) U.S. Cl.
CPC ........ *H04W 4/021* (2013.01); *G07C 9/00309* (2013.01); *G07C 9/00896* (2013.01); *H04L 12/282* (2013.01); *H04W 4/023* (2013.01); *H04W 4/027* (2013.01); *H04W 4/80* (2018.02); *H04W 12/50* (2021.01); *H04W 84/12* (2013.01); *G07C 2009/00769* (2013.01); *G07C 2009/00928* (2013.01); *G07C 2209/63* (2013.01); *H04L 2012/2841* (2013.01)

(58) Field of Classification Search
CPC .................................. H04W 4/02; H04W 4/80
See application file for complete search history.

(56) References Cited

U.S. PATENT DOCUMENTS

| | | | |
|---|---|---|---|
| 2012/0172027 A1 | 7/2012 | Partheesh | |
| 2015/0089624 A1 | 3/2015 | Kim | |
| 2018/0348718 A1 | 12/2018 | Richardson | |
| 2019/0196432 A1 | 6/2019 | Morley | |
| 2020/0248496 A1 | 8/2020 | Riesebosch | |
| 2021/0312798 A1 * | 10/2021 | Huang | G01C 21/3837 |
| 2022/0236324 A1 * | 7/2022 | Takahashi | G01R 31/3177 |
| 2022/0262250 A1 * | 8/2022 | Nakagawa | G08G 1/141 |

OTHER PUBLICATIONS

International Search Report and Written Opinion of international application No. PCT/US2023/8065296, mailed Aug. 1, 2023, 10 pp.

\* cited by examiner

*Primary Examiner* — Michael T Vu
(74) *Attorney, Agent, or Firm* — Greenberg Traurig, LLP (57) ABSTRACT

Systems, methods and apparatus are described for automatically performing home or business-based actions. A predefined geographic boundary may be defined around a home or a business. When a personal communication device inside a vehicle crosses a boundary of the predefined geographic boundary, the personal communication device sends a short range message to a point-to-point transceiver in the vehicle, and the point-to-point transceiver sends a signal directly to a controller in the home or business to automatically perform the one or more home or business-based actions.

20 Claims, 4 Drawing Sheets

METHOD AND APPARATUS FOR LOCATION-BASED, AUTOMATED CONTROL OF ELECTRONIC DEVICES

BACKGROUND

I. Field of Use

The present application relates to the field of consumer electronics. More specifically, the present application relates to location-based, automated control of certain electronic devices in homes or businesses.

II. Description of the Related Art

Geofencing is a geo-location technique that allows users to set up automated actions when a person or an object, such as a vehicle, cellular telephone, wearable device, etc., enters or leaves a pre-defined, geographic boundary. For example, a circular "geofence" may be established around a home, having a radius of 100 yards, to automatically open a garage door once a particular vehicle or a smart phone enters the geofenced area.

The location of a person or an object may be determined by the person or object, or by an electronic device located in a home or business that additionally causes one or more actions to occur when a person/object enters or leaves the geofenced area. For example, in the former, a smartphone may automatically and continuously determine its location and report the location via a cellular and/or IP-based network to a lighting controller located inside a home, which causes certain lighting "scenes" to occur as a person is close to arriving home. In another example, a smartphone may execute a software application or "app" that allows a user to define a geofence, and then automatically transmit an indication to a home electronic device when the smart phone enters or leaves the geofenced area. When the home electronic device receives the indication, it may cause one or more pre-determined actions to occur in the home. In the latter case, an Internet-connected home electronic device may determine the location of an object such as a smartphone or vehicle, and cause one or more actions to occur when the home electronic device determines that the object has entered or has left the geofenced area.

While geofencing is widely used, it does suffer several drawbacks. For example, legacy home electronic devices, such as garage door operators, HVAC systems or lighting systems may not be network-compatible, i.e., have no ability to connect to a smartphone via the Internet to know the smartphone's location. Additionally, it may not be desirable to automatically perform actions in a home or business just because a smartphone has entered or left a geofenced area. For example, if a user takes a walk around the block, it may be undesirable for a garage door to open if the user re-enters the geofenced area.

In the case of garage door operators, programming a vehicle to either manually or automatically operate a garage door has traditionally been cumbersome and confusing. For example, a homeowner must typically press a "learn" button located on a garage door operator, and then press and hold a garage door operation button inside the homeowner's vehicle in order to "teach" the vehicle how to communicate with the garage door operator. Typically, access to the learn button on the operator requires the homeowner to locate a small ladder, then climb up to press the learn button. Then, within a limited time frame, the homeowner must press and hold a button inside the homeowner's vehicle and observe a light as it flashes from one rate to another. It is not often clear when the rate of flashing changes, nor exactly when the vehicle has learned how to communicate with the garage door operator. In many cases, this operation must be repeated, until the proper sequence of actions is performed correctly.

SUMMARY

The embodiments described herein relate to methods, systems, and apparatus for automatically performing one or more predetermined, automated home or business-based actions. In one embodiment, a personal communication device is described, comprising a non-transitory memory for storing processor-executable instructions and a predefined geographic boundary, means for determining a location of the personal communication device, a short range communication interface for transmitting short range messages to a point-to-point transceiver in proximity to the personal communication device, and a processor, coupled to the memory, the means for determining a location of the personal communication device and the short range communication interface, for executing the processor-executable instructions that causes the personal communication device to determine, by the processor via the means for determining a location of the personal communication device, a present location of the personal communication device, determine, by the processor, that the personal communication device has crossed the predetermined geographic boundary based on the present location of the personal communication device and the predetermined geographic boundary, and in response to determining that the personal communication device has crossed the predetermined geographic boundary, transmit, by the processor via the short range communication interface, a short range message to the point-to-point transceiver in proximity to the personal communication device, the short range message causing the point-to-point transceiver to transmit a point-to-point signal directly to a controller located inside a home or a business, for causing the one or more predetermined, automatic actions to occur at the home or business when the controller receives the point-to-point signal.

In another embodiment, a method, performed by a personal communication device, for automatically performing one or more predetermined, automated home or business-based actions is described, comprising determining a present location of the personal communication device, determining that the personal communication device has crossed a predefined geographic boundary based on the present location and the predefined geographic boundary, and in response to determining that the personal communication device has crossed the predefined geographic boundary, transmitting a short range message to a point-to-point transceiver in proximity to the personal communication device, the short range message causing the point-to-point transceiver to transmit a point-to-point signal directly to a controller located at a home or a business, for causing the one or more predetermined, automatic actions to occur at the home or business when the controller receives the point-to-point signal.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Systems, methods and apparatus are described herein for performing location-based, automated operation of electronic devices in homes or businesses. A predetermined geographic boundary, or geofence, is created that defines a geographic boundary around a home or business. A personal communication device in a vehicle determines when the personal communication device has crossed the predefined geographic boundary and, in response, transmits a short range message to a point-to-point transceiver, also located in the vehicle. The personal communication device may use information pertaining to the vehicle to confirm that the personal communication device has, indeed, crossed the predefined geographic boundary, and/or to confirm that the personal communication device is in a vehicle that is moving. The point-to-point transceiver, in turn, transmits a point-to-point signal directly to a controller inside the home or business that causes the controller to perform one or more actions, such as to open or close a garage door, turn lights on or off, arm or disarm a security system, adjust the air temperature of the home or business via an HVAC system, etc.

Figure 1:
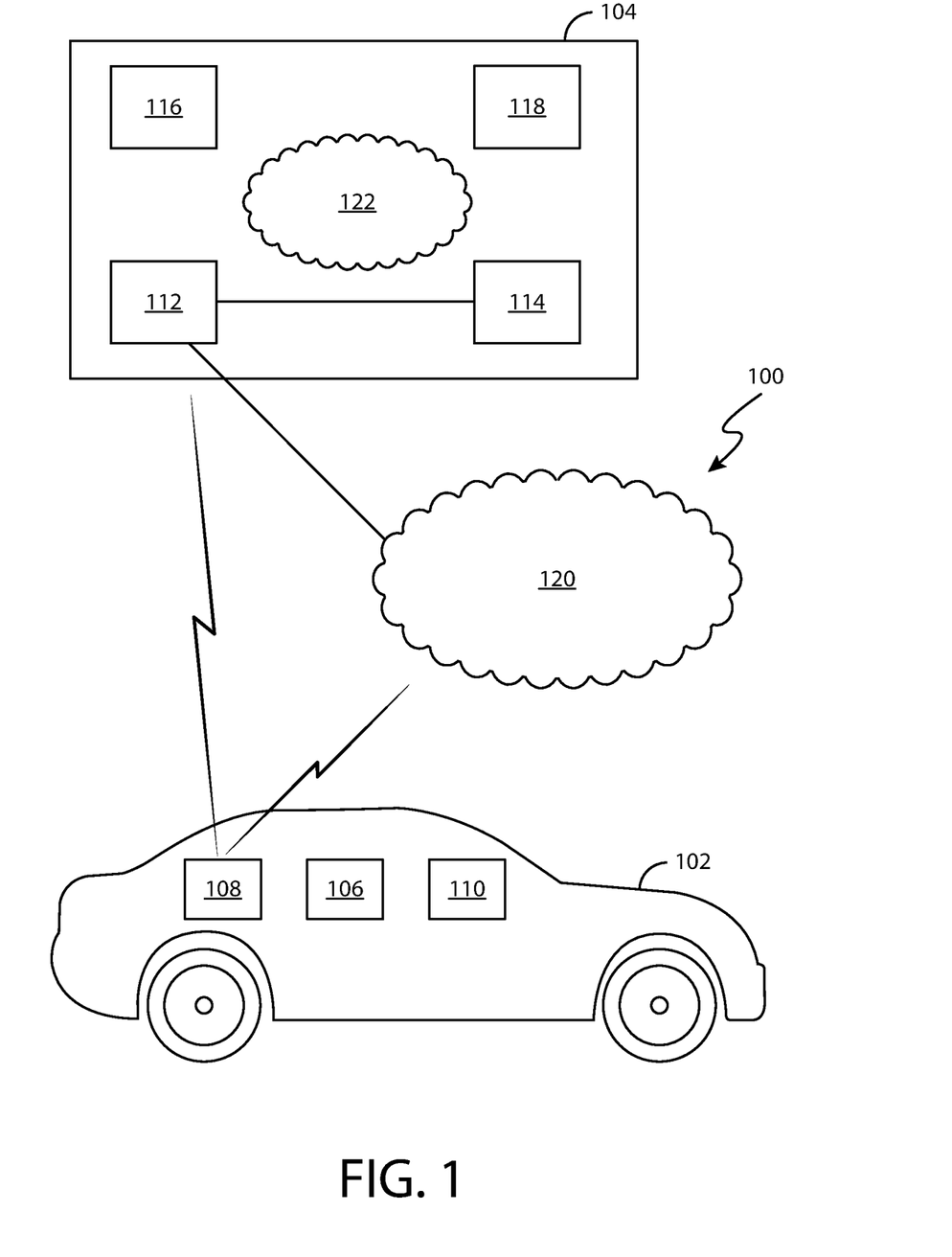
FIG. 1 is a block diagram of a system for performing location-based, predefined, automatic actions at homes or businesses.

FIG. 1 is a block diagram of a system 100 for performing location-based, automatic control of electronic devices in homes or businesses. Shown is vehicle 102, structure 104, personal communication device 106, point-to-point transceiver 108, vehicle computer 110, controller 112, garage door operator 114, security controller 116, lighting controller 118, wide-area network 120 and local-area network 122. The sizes of the various blocks in FIG. 1 are not to scale or to scale with respect to each other.

Structure 104 comprises a home or business. Several electronic devices are located within structure 104, such as garage door operator 114, security controller 116 and lighting controller 118. Each of the electronic devices may be controlled by controller 112, communicating with the electronic devices via local-area network 122, such as a Wi-Fi network. In addition to communicating with the electronic devices via local-area network 122, controller 112 comprises a point-to-point receiver that receives wireless signals directly from point-to-point transceiver 108 located in vehicle 102. The term "directly" is defined herein as transmitting or receiving a wireless signal from one point to another without the use of any intermediary devices, such as repeaters, cellular base stations, routers, other mesh-network devices, etc. Cellular communications are not an example of direct communications, as wireless signals are generally routed through one or more base stations. For example, point-to-point transceiver 108 may transmit direct signals to controller 112, where the direct signals propagate through the air from point-to-point transceiver 108 to controller 112 without the use of any repeaters, access points, etc. The point-to-point receiver inside controller 112 may use one or more well-known communication technologies, such as long-range Zwave®, sub-Gigahertz RF, Bluetooth, etc.

Security controller 116 comprises a professional security panel, consumer-grade hub, central monitoring device, or the like, that receives wireless signals from a variety of security sensors distributed throughout structure 104 (not shown). Security controller 116 and the sensors define a security system. When the security system is armed, and an event occurs at the structure, such as a door or a window opening, or motion begin detected, security controller 116 may cause one or more predetermined, automatic actions to occur, such as flashing certain lights inside or outside structure 104, causing a loud siren to sound inside structure 104, and/or contacting a remote monitoring center (not shown) which may dispatch local authorities, such as the police or fire department. The security system may be armed and disarmed by controller 112 when controller 112 receives a signal from point-to-point transceiver 108 in vehicle 102 when personal communication device 106 crosses the predefined geographic boundary, and, in some embodiments, certain other conditions are met, as will be explained in greater detail later herein.

Garage door operator 114 comprises a controller that causes a garage door to open and close. Garage door operator 114 may not have a capability of communicating with local-area network 122, i.e., may not be Internet-compatible. Older, legacy garage door operators fall into this category, and do not allow remote operation of the garage door over the Internet. Garage door operator 114 is commonly found in millions of homes and businesses throughout the world, manufactured by such well-known manufacturers such as Chamberlain Group or The Genie Company. Controller 112 may send signals to garage door operator 114 via a two-wire connection for garage door operator 114 to cause the garage door to open and close in response to receiving point-to-point signals from point-to-point transceiver 108.

Lighting controller 118 comprises an electronic device that causes one or more lights inside or outside structure 104 to turn on and off. Lighting controller 118 comprises one of many consumer-based home automation hubs that control one or more lights inside or outside structure 104, such as a SmartThings® hub, a HomeKit® hub, etc. Controller 112 may send signals to lighting controller 118 via local-area network 122 when controller 112 receives point-to-point signals from point-to-point transceiver 108.

Personal communication device 106 comprises a device capable of providing voice and/or data communications to a user of personal communication device 106. For example, personal communication device 106 may comprise a cellular or satellite mobile phone or a wearable device (such as a smartwatch). Personal communication device 106 may execute a mobile software application or "app" that may allow a user to define a geographic boundary around structure 104 for purposes of automatically causing one or more predetermined, automatic actions to occur at structure 104 when personal communication device 106 crosses the geographic boundary and, in some embodiments, other conditions are met. Personal communication device 106 is typically capable of determining its location using well-known technologies such as GPS and/or terrestrial-based location systems. Personal communication device 106 is further capable of direct, short range communications with point-to-point transceiver 108 and vehicle computer 110, for example, using Bluetooth, Bluetooth LE, or some other short range communication technology. When personal communication device 106 crosses the predefined geographic boundary, personal communication device 106 determines the crossing, and may, in response, determine one or more other conditions, such as whether personal communication device 106 is traveling at more than a predetermined speed, whether personal communication device 106 is in communications with vehicle computer 110, whether personal communication device 106 is presently co-located with vehicle 102 and, generally, whether personal communication device 106 is inside vehicle 102 and, in some embodiments, that vehicle 102 is moving at a speed greater than the predetermined speed. When personal communication device 106 determines that it has crossed the geographic boundary, and, in some embodiments, that one or more other conditions have been satisfied, personal communication device 106 transmits a short range message to point-to-point transceiver 108 and, in response, point-to-point transceiver 108 transmits a point-to-point signal to controller 112 inside structure 104, indicating that personal communication device 106 has crossed the geographic boundary, and, in some embodiments, that one or more other conditions have been met.

Point-to-point transceiver 108 comprises a short range receiver and a point-to-point transmitter. In some embodiments, Point-to-point transceiver 108 may, additionally or alternatively, comprise a wide-area transmitter for transmitting signals to receiver 112 either directly or indirectly, i.e., via wide-area network 120. The term "short range" as defined herein means a distance less than 10 feet. Point-to-point transceiver 108 is capable of receiving short range signals from personal communication device 106 when personal communication device 106 crosses the geographic boundary and, in some embodiments, an indication that one or more other conditions are satisfied. In response to receiving a short range signal from personal communication device 106, point-to-point transceiver 108 transmits a wireless signal directly to controller 112, indicating that personal communication device 106 has crossed the geographic boundary and, in some embodiments, that one or more other conditions have been satisfied. The point-to-point transmitter of point-to-point transceiver 108 may use one or more well-known communication technologies, such as long-range Zwave®, sub-Gigahertz RF, Bluetooth, etc. The short range receiver of point-to-point transceiver 108 may comprise one or more well-known technologies such as Bluetooth, Bluetooth LE, RF, etc. Point-to-point transceiver 108 may comprise a form factor of something smaller than a pack of cigarettes, may be permanently installed into vehicle 102 and may be powered by a cigarette lighter outlet, and OBD-II connection point, or hardwired to the vehicle's power system.

Vehicle computer 110 comprises an on-board computer system typically found in most modern vehicles. Vehicle computer 110 may control a wide variety of operations of vehicle 102, such as controlling a fuel/air mixture, determining a location of vehicle 102, determining a speed of vehicle 102, controlling air conditioning components of vehicle 102, etc. Vehicle computer 110 may communicate with personal communication device 106 either directly, such as by using a short range communication technology previously discussed, or indirectly, such as via wide-area network 120, which may comprise one or more of a cellular or satellite data network, the Internet, etc. In some embodiments, vehicle computer 110 may "pair" with personal communication device 106 and provide certain information to personal communication device 106, such as a speed or location of vehicle 102, or simply an indication that vehicle computer 110 has been successfully paired with personal communication device while six.

Figure 2:
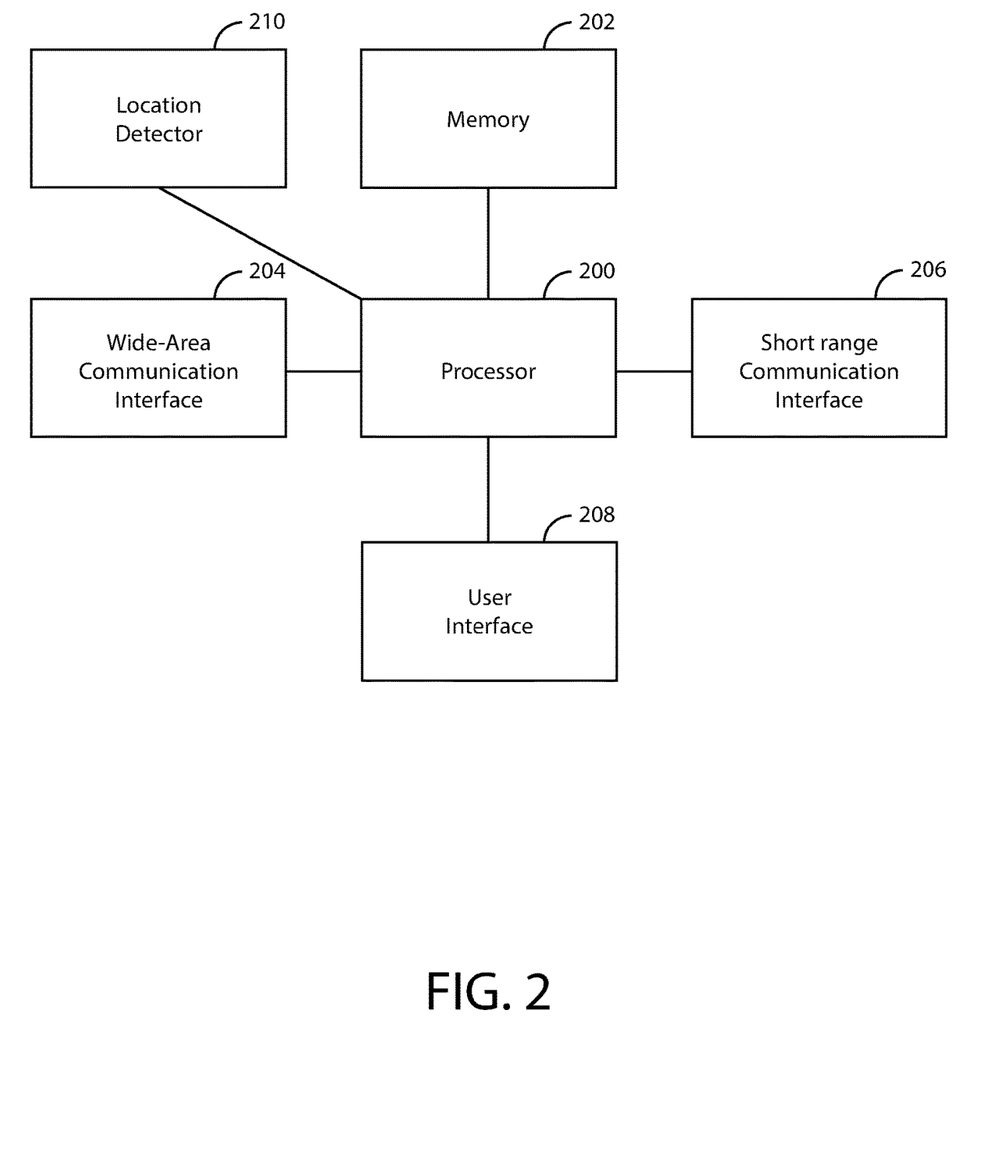
FIG. 2 is a functional block diagram of one embodiment of a personal communication device as shown in FIG. 1.

FIG. 2 is a functional block diagram of one embodiment of personal communication device 106. Specifically, FIG. 2 shows processor 200, memory 202, wide-area communication interface 204, short range communication interface 206, user interface 208 and location detector 210. It should be understood that the functional blocks may be connected to one another in a variety of ways, and that not all functional blocks necessary for operation of personal communication device 106 are shown (such as a power supply), for purposes of clarity.

Processor 200 is configured to provide general operation of personal communication device 106 by executing processor-executable instructions stored in memory 202, for example, executable code. Processor 200 typically comprises a specialized ASIC for use, for example, in modern cellular smart phones, although in other embodiments, any one of a variety of microprocessors, microcomputers, and/or microcontrollers may be used, selected based on factors such as cost, processing power, onboard memory capacity, etc. The processor-executable instructions may comprise a mobile software application or "app" that performs particular operations of personal communication device 106, including one or more methods for automatically controlling operation of remote electronic devices located in structure 104. The app may allow a user to establish a predefined geographic boundary around structure 104, determine when personal communication device 106 crossed the geographic boundary and notify point-to-point transceiver 108.

Memory 202 is coupled to processor 200, comprising one or more non-transitory information storage devices, such as RAM, ROM, EEPROM, flash memory, or other type of electronic, optical, or mechanical memory device. Memory 202 is used to store processor-executable instructions for operation of personal communication device 106 as well as any information used by processor 200, such as location information, connection information, (i.e., information needed to connect to transceiver 108 and/or vehicle computer 110, etc.). It should be understood that reference to memory 202 may include references to more than one memory type or device, such as RAM memory for storing temporary information and flash memory for storing non-volatile information. In some embodiments, all or a portion of memory 202 is incorporated into processor 200.

Wide-area communication interface 204 is coupled to processor 200, comprising circuitry for allowing personal communication device 106 to communicate wirelessly with other remotely-located electronic devices, such as other personal communication devices, remote computers, remote servers, etc. via wide-area network 120. Typically, wide-area communication interface comprises one or more well-known cellular communication modems and related circuitry, along with associated firmware, in some embodiments.

Short range communication interface 206 is coupled to processor 200, comprising well-known circuitry for allowing personal communication device 106 to communicate with point-to-point transceiver 108 and in some embodiments, with vehicle computer 110. Typically, short range communication interface 206 comprises wireless interface circuitry, but in some other embodiments, short range communication interface 206 comprises a mechanical port for allowing wired communications with transceiver 108 and/or vehicle computer 110. Short range communication interface 206 may comprise Bluetooth circuitry, Zwave circuitry, Zigbee circuitry, or any other well-known communication technology that allows personal communication device 106 to communicate with transceiver 108 over relatively short distances, such as less than 50 feet.

User interface 208 is coupled to processor 200, comprising well-known hardware for allowing a user of personal communication device 106 to enter information into, and receive information from, personal communication device 106. For example, user interface 208 may comprise a touchscreen display and/or one or more pushbuttons. User interface 208 may receive confirmations from a user when queried by processor 200, and processor 200 may alert a user to such queries, as is well-known in the art.

Location detector 210 is coupled to processor 200, comprising means for determining a location of personal communication device 106. Location detector 210 may comprise well-known GPS technology and/or terrestrial-based technology to accurately determine a location of personal communication device 106. Such technologies are well-known in the art.

Figure 3A:
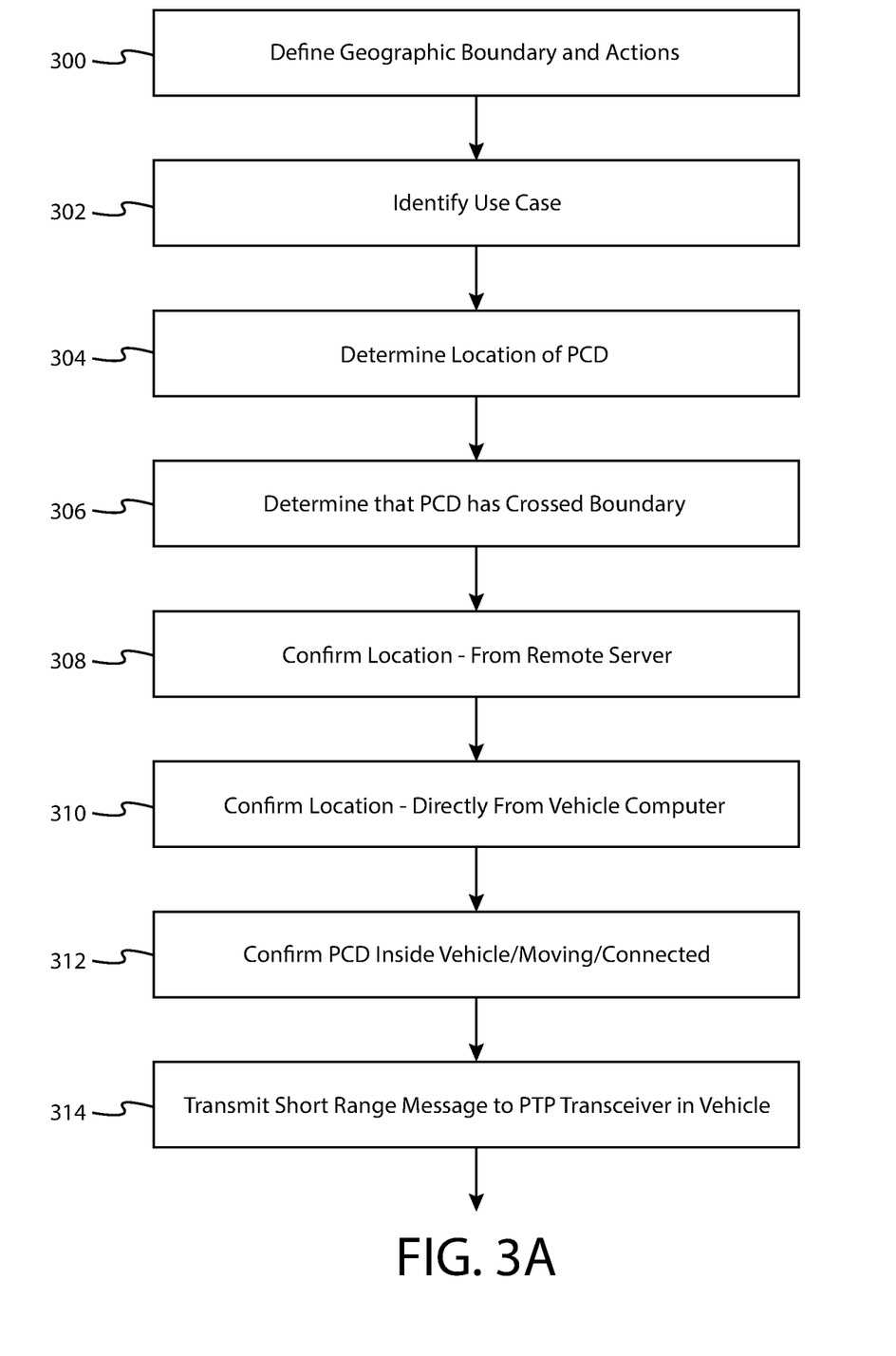
FIGS. 3A and 3B are a flow diagram illustrating one embodiment of a method performed by the personal communication device shown in FIGS. 1 and 2 automatically performing one or more home or business-based actions.
Figure 3B:
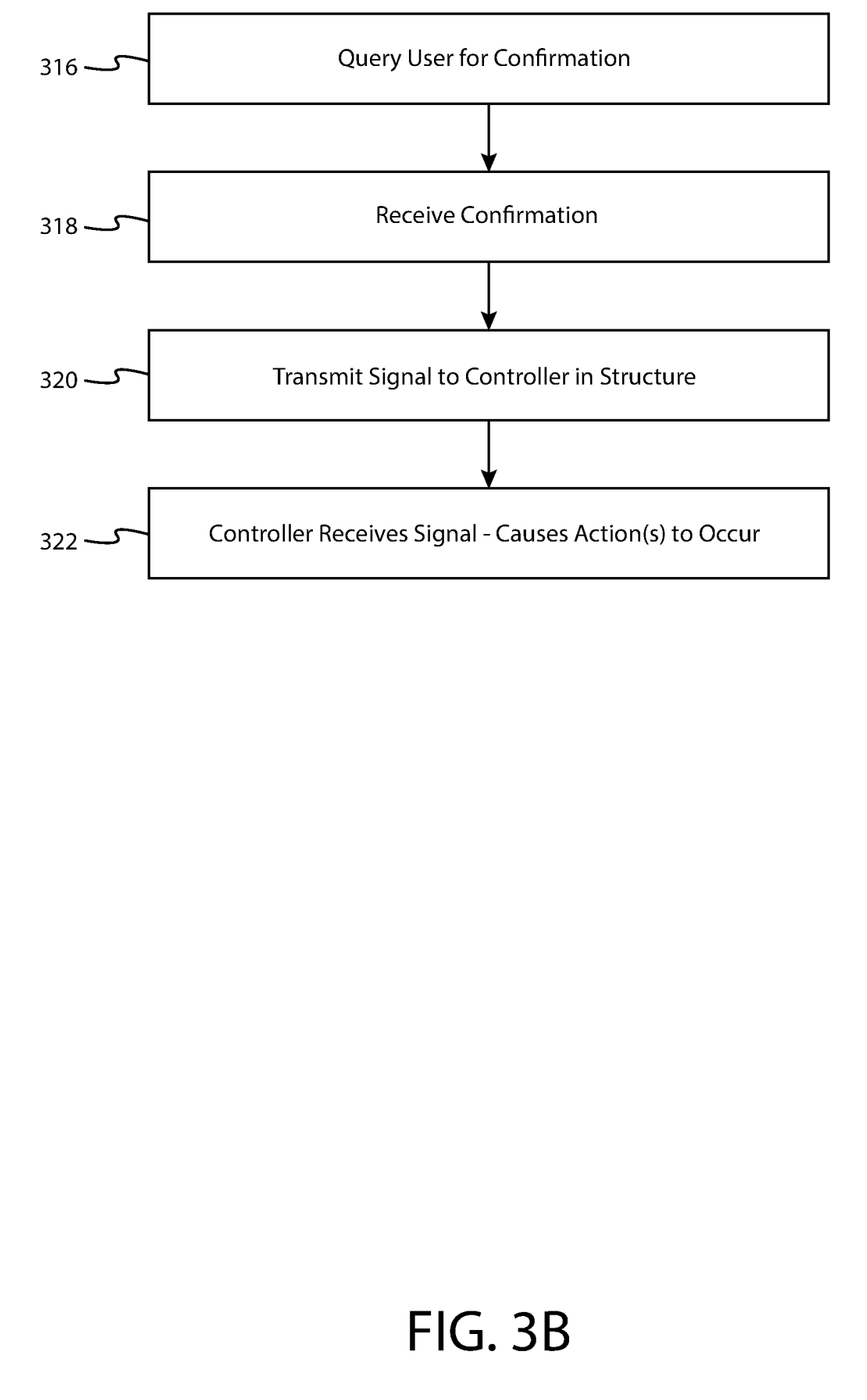

FIG. 3 is a flow diagram illustrating one embodiment of a method performed by personal communication device 106 for automatically controlling operation of remote electronic devices located in structure 104. It should be understood that in some embodiments, not all of the steps shown in FIG. 3 are performed. It should also be understood that the order in which the steps are carried out may be different in other embodiments.

At block 300, a user of personal communication device 106 (i.e., "PCD") may define a geographic boundary around structure 104 using an app that has been pre-loaded onto personal communication device 106 in the form of processor-executable instructions. The geographic boundary may define one or more distances from structure 104 at which the user desires one or more actions occur at structure 104 as the user crosses the geographic boundary, either incoming or outgoing. The app may further be used by the user to define which actions occur upon crossing the geographic boundary. For example, a user could use the app to cause garage door operator 114 to open a garage door at structure 104 when the user crosses the geographic boundary upon returning to structure 104. In another example, the user may use the app to cause all lights within structure 104 to be turned off by lighting controller 118 when the user crosses the geographic boundary as the user leaves structure 104. The geographic boundary and a selection of one or more predetermined actions to be automatically performed are received by processor 200 via user interface 208 and stored in memory 202.

At block 302, for purposes of this example, the user is driving vehicle 102, carrying personal communication device 106, and vehicle 102 is outside the predefined geographic boundary, headed back to structure 104. Point-to-point point transceiver 108 has been pre-installed into vehicle 102, such as by common mechanical fastening means and/or electronic coupling, for example, via an OBD-II connector inside vehicle 102. Also, for purposes of this example, security controller 116 has been placed into an armed mode of operation, lighting controller 118 has caused all of the lights at structure 104 to be turned off, and garage door operator 114 has placed a garage door at structure 104 into a closed position.

At block 304, processor 200 and/or location detector 210 determines one or more locations of personal communication device 106 on earth as vehicle 102 moves towards structure 104, using GPS, terrestrial, or some other well-known means for determining a location of personal communication device 106. Typically, processor 200/location detector 210 determines multiple locations over time, providing updated location information several times per second.

At block 306, processor 200 determines that personal communication device 106 has crossed the predefined geographic boundary by comparing a present location of personal communication device 106 to the predefined geographic boundary stored in memory 202. Processor 200 may further determine that personal communication device 106 is headed towards structure 104, rather than away from it, using a series of recent locations of personal communication device 106.

At block 308, in another embodiment, processor 200 may confirm the location of personal communication device 106 by comparing one or more recent locations of personal communication device 106 as determined by processor 200/location detector 210 as compared to one or more recent locations of vehicle 102 as provided by a network-based computer server (not shown). In this embodiment, personal communication device 106 may be preconfigured to periodically receive locations of vehicle 102 over time from the network-based computer server that tracks the location of vehicle 102 over time. In this embodiment, vehicle computer 110 may provide periodic updates of the location of vehicle 102 to the network-based computer server via a wide-area communication interface of vehicle computer 110, such as a cellular data transmitter. In another embodiment, when processor 200/location detector 210 determines that personal communication device has crossed the predefined geographic boundary, processor 200 may cause wide-area communication interface 204 to transmit a request to the network-based computer server, requesting that the network-based computer provide one or more recent locations of vehicle 102. When the network-based computer server receives the request from processor 200, it responds by transmitting one or more recent locations of vehicle 102 to processor 200 via wide-area communication interface 204.

In any case, after processor 200 receives one or more recent locations of vehicle 102, processor 200 may compare the one or more recent locations to one or more recent locations determined by processor 200/location detector 210, in order to confirm that personal communication device 106 has, in fact, crossed the predefined geographic boundary.

At block 310, in yet another embodiment, processor 200 may confirm the location of personal communication device 106 by comparing one or more recent locations of personal communication device 106 as determined by processor 200/location device 210 as compared to one or more recent locations of vehicle 102 as provided by vehicle computer 110. In this embodiment, personal communication device 106 may be preconfigured to periodically receive locations of vehicle 102 over time from vehicle computer 110 that, among other things, tracks the location of vehicle 102 over time, using GPS, terrestrial, or some other well-known location determination technology. In this embodiment, vehicle computer 110 may provide periodic updates of the location of vehicle 102 to personal communication device 106 via a short range transceiver of vehicle computer 110, such as Bluetooth, Bluetooth LE, Zigbee, Zwave, or some other well-known, short range communication technology, or via a wired interface. In another embodiment, when processor 200/location detector 210 determines that personal communication device has crossed the predefined geographic boundary, processor 200 may cause short range communication interface 206 to transmit a request to vehicle computer 110, requesting that vehicle computer 110 provide one or more recent locations of vehicle 102. When vehicle computer 110 receives the request from processor 200, it responds by transmitting one or more recent locations of vehicle 102 to processor 200 via short range communication interface 206.

At block 312, in yet another embodiment, processor 200 may confirm that personal communication device 106 is in a vehicle at the time that personal communication device 106 crosses the predefined geographic boundary, in order to confirm that the user is actually approaching or leaving structure 104 for a significant amount of time, such as an hour or more and, therefore, that the one or more predefined automatic actions should occur. Additionally, confirming that the user is in a vehicle may avoid false alerts that the user is leaving structure 104 for a significant period of time. For example, if a user is walking to a mailbox to retrieve the user's mail, personal communication device 106 may erroneously determine that personal communication device 106 has crossed a predefined geographic boundary and transmit a signal to controller 112 inside structure 104, automatically causing a garage door to close.

In this embodiment, processor 200 may confirm that personal communication device 106 is in a vehicle by "pairing" with vehicle computer 110. Pairing is a well-known short range communication technique used by certain technologies, such as Bluetooth and Bluetooth LE, for example, for initiating communications between two devices. Typically, a user pairs personal communication device 106 with vehicle computer 110 during an initial pairing, and then, pairing is automatic between the two devices whenever personal communication device 106 is in range of vehicle computer 110. Upon pairing with vehicle computer 110, processor 200 may store an indication in memory 202, indicating that personal communication vice 106 is paired with vehicle computer 110 and therefore infer that personal communication device 106, as well as a user of personal communication device 106, is inside the vehicle and that the vehicle is likely moving.

In another embodiment, processor 200 may confirm that personal communication device 106 is in a moving vehicle by determining a speed of personal communication device 106 at or near the time that personal communication device 106 crosses the predefined geographic boundary. In this embodiment, location detector 210 may additionally calculate a speed of personal communication device 106 using the position data that it normally generates. In other embodiments, a separate component of vehicle computer 110 may determine the speed of vehicle 102. Such speed calculation based on location is well-known in the art. When processor 200 determines that personal communication device 106 is moving at a speed that is greater than a predetermined minimum speed, such as 15 mph, processor 200 may determine that personal communication device 106 is in a moving vehicle.

In a related embodiment, processor 200 can determine the speed of personal communication device 106, using the technique described above, and determine that personal communication device 106 is in a moving vehicle. In another, related embodiment, processor 200 can determine the speed of personal communication device 106 and compare that speed to a speed provided by vehicle computer 110. Vehicle computer 110 may separately calculate a speed of vehicle 102 on an ongoing basis, and provide the calculated speed to personal communication device 106 via short range communication interface 206, or via wide-area communication interface 204, in an embodiment where vehicle computer 110 provides the speed of vehicle 102 to the network-based computer server as described above. Processor 200 may compare the calculated speed from vehicle computer 110 to its own calculated speed and determined that personal communication device 106 is moving within a vehicle when the two speeds match each other, and each speed indicates that personal communication device 106 is traveling greater than a predetermined speed, such as 15 mph.

At block 314, in response to at least determining that personal communication device 106 has crossed the predefined geographic boundary, processor 200 causes short range communication interface 206 to transmit a short range message to point-to-point transceiver 108, for example, a message transmitted in accordance with the well-known Bluetooth LE protocol. The message is indicative that personal communication device 106 has crossed the predefined geographic boundary and, in some embodiments, that personal communication device 106 is moving either towards or away from structure 104.

In another embodiment, in response to determining that personal communication device 106 has crossed the predefined geographic boundary and confirmed the location of personal communication device 106 by comparing one or more recent locations of personal communication device 106 as determined by processor 200/location detector 210 to one or more recent locations of vehicle 102 as determined by vehicle computer 110 either directly, via short range communication interface 206 or from the network-based computer server that receives periodic location information from vehicle computer 110. When processor 200 confirms the location of personal communication device 106, in this embodiment, only then does processor 200 cause a short range message to be sent to point-to-point transceiver 108 via short range communication interface 206 indicating that conditions have been satisfied for an automatic event to occur at structure 104.

In yet another embodiment, in response to determining that personal communication device 106 across the predefined geographic boundary and that personal communication device 106 is in a vehicle at the time that personal communication device 106 crosses the predefined geographic boundary, (by determining, for example, that personal communication device 106 is currently paired with vehicle computer 110 at or near the time that personal communication device 106 crosses the predetermined geographic boundary) only then does processor 200 cause a short range message to be sent to point-to-point transceiver 108 via short range communication interface 206 indicating that conditions have been satisfied for an automatic event to occur at structure 104.

In yet still another embodiment, in response to determining that personal communication device 106 across the predefined geographic boundary and that personal communication device 106 is in a moving vehicle at the time that personal communication device 106 crosses the predefined geographic boundary, (by determining, for example, that the speed of personal communication device 106 exceeds a predetermined minimum speed or that the speed of personal communication device 106 matches a speed of vehicle 102 at or near the time that personal communication device 106 crosses the predetermined geographic boundary) only then does processor 200 cause a short range message to be sent to point-to-point transceiver 108 via short range communication interface 206 indicating that conditions have been satisfied for an automatic event to occur at structure 104.

At block 316, in any of the embodiments just discussed, above, prior to processor 200 causing the short range message to be transmitted to point-to-point transceiver 108 via short range communication interface 206, processor 200 may cause a query to be presented to the user of personal communication device 106 via user interface 208, asking the user for confirmation that the user, indeed, desires one or more predetermined, automated actions to occur at structure 104 as a result of personal communication device 106 crossing the predefined geographic boundary.

At block 318, processor 200 receives a response from the user via user interface 208. If the response indicates that the user desires that one or more predetermined, automated actions occur at structure 104, then processor 200 causes the short range message to be transmitted to point-to-point transceiver 108. If the response indicates that the user does not wish to initiate the one or more predetermined, automated actions, processor 200 does not transmit the short range message to point-to-point transceiver 108 and resumes monitoring the location of personal communication device 106. The user may not wish to initiate the one or more predetermined, automated actions at structure 104 if the user is, for example, taking a walk around the neighborhood, or otherwise not in a vehicle approaching or departing structure 104.

At block 320, in response to receiving the short range message from personal communication device 106, point-two-point transceiver 108 transmits a point-to-point signal to controller 112 located at structure 104. The signal comprises an indication that personal communication device 106 has just crossed the predefined geographic boundary and, in some embodiments, in a particular direction, either towards or away structure 104, as well as, in some embodiments, an indication of whether one or more conditions have additionally been met, such as a confirmation of the location of personal communication device 106, an indication that personal communication device 106 is paired with vehicle computer 110, whether the speed of personal communication device 106 is greater than a predetermined minimum threshold, etc.

At block 322, the point-to-point signal is received by controller 112. In response, controller 112 determines that personal communication device 106 has crossed the predefined geographic boundary, and any other conditions associated with personal communication device 106, and, in response, causes one or more predetermined, automated actions to occur at structure 104, such as causing garage door operator 114 to open or close a garage door, causing lighting controller 118 to turn one or more lights at structure 104 on or off, and/or causing security controller 116 to arm or disarm a security system.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A personal communication device for automatically performing one or more home or business-based actions, comprising:
   a non-transitory memory for storing processor-executable instructions and a predefined geographic boundary;
   means for determining a location of the personal communication device;
   a short range communication interface for transmitting short range messages to a point-two-point transceiver in proximity to the personal communication device; and
   a processor, coupled to the memory, the means for determining a location of the personal communication device and the short range communication interface, for executing the processor-executable instructions that causes the personal communication device to:
      determine, by the processor via the means for determining a location of the personal communication device, a present location of the personal communication device;
      determine, by the processor, that the personal communication device has crossed a predetermined geographic boundary based on the present location of the personal communication device and the predetermined geographic boundary; and
      in response to determining that the personal communication device has crossed the predetermined geographic boundary, transmit, by the processor via the short range communication interface, a short range message to the point-to-point transceiver in proximity to the personal communication device, the short range message causing the point-to-point transceiver to transmit a wireless signal directly to a controller located at the home or a business, for causing the one or more predetermined, automatic actions to occur at the home or business when the controller receives the point-to-point signal.

2. The personal communication device of claim 1, wherein a first action of the one or more predetermined, automatic actions comprises opening a garage door.

3. The personal communication device of claim 1, wherein a first action of the one or more predetermined, automatic actions comprises illuminating at least one light.

4. The personal communication device of claim 1, further comprising:
   a wide-area communication interface;
   wherein the processor-executable instructions comprise further instructions that causes the personal communication device to:
      receive, by the processor from the wide-area communication interface, a location of a vehicle; and transmit, by the processor via the short range communication interface, the short range message to the point-to-point transceiver only when the personal communication device has crossed the predefined geographic boundary and the location of the personal communication device and the location of the vehicle are within a predetermined distance from each other.

5. The personal communication device of claim 4, wherein the predetermined distance is 20 feet or less.

6. The personal communication device of claim 1, wherein the short range communication interface is configured to additionally communicate directly with a vehicle computer located within a vehicle, and wherein the processor-executable instructions comprise further instructions that causes the personal communication device to:
   determine, by the processor from the short range communication interface, that the personal communication device is inside the vehicle; and
   transmit, by the processor via the short range communication interface, the short range message to the point-to-point transceiver only when the personal communication device has crossed the predefined geographic boundary and the personal communication device is inside the vehicle.

7. The personal communication device of claim 6, wherein the processor-executable instructions that cause the personal communication device to determine that the personal communication device is inside the vehicle comprises instructions that causes the personal communication device to:
   pair, by the processor, the personal communication device with a vehicle computer of the vehicle; and
   determine, by the processor, that the personal communication device is inside the vehicle when the personal communication device has been paired with the vehicle computer.

8. The personal communication device of claim 1, further comprising:
   a wide-area communication interface;
   wherein the means for determining a location of the personal communication device additionally determines a speed of the personal communication device, and wherein the processor-executable instructions comprise further instructions that causes the personal communication device to:
   receive, by the processor from the wide-area communication interface, a speed of a vehicle;
   determine, by the processor from the means for determining a location of the personal communication device, a speed of the personal communication device; and
   transmit, by the processor via the short range communication interface, the short range message to the point-to-point transceiver only when the personal communication device has crossed the predefined geographic boundary and the speed of the vehicle and the speed of the personal communication device is within a predetermined speed of one another.

9. The personal communication device of claim 8, wherein the predetermined speed is 10 miles-per-hour or less.

10. The personal communication device of claim 1, further comprising:
    a user interface;
    wherein the processor-executable instructions comprise further instructions that causes the personal communication device to:
    in response to determining that the personal communication device has crossed the predefined geographic boundary, and prior to transmitting the short range message to the point-to-point transceiver, display, by the processor via the user interface, a query asking a user to confirm that the user wishes the one or more predetermined, automatic actions to occur;
    receive, by the processor via the user interface, a response to the query; and
    transmit, by the processor via the short range communication interface, the short range message to the point-to-point transceiver only when the response indicates that the user desires the one or more predetermined, automatic actions to occur.

11. A method for automatically performing home or business-based actions, comprising:
    determining a present location of the personal communication device;
    determining when the personal communication device has crossed a predefined geographic boundary based on the present location and the predefined geographic boundary; and
    in response to determining when the personal communication device has crossed the predefined geographic boundary, transmitting a short range message to a point-to-point transceiver in proximity to the personal communication device, the short range message causing the point-to-point transceiver to transmit a wireless signal directly to a controller located inside the home or a business, for causing one or more predetermined, automatic actions to occur at the home or business when the controller receives the point-to-point signal.

12. The method of claim 11, wherein a first action of the one or more predetermined, automatic actions comprises opening a garage door.

13. The method of claim 11, wherein a first action of the one or more predetermined, automatic actions comprises illuminating at least one light.

14. The method of claim 11, further comprising:
    receiving a location of a vehicle; and
    transmitting the short range message to the point-to-point transceiver only when the personal communication device has crossed the predefined geographic boundary and the location of the personal communication device and the location of the vehicle are within a predetermined distance from each other.

15. The method of claim 14, wherein the predetermined distance is 50 feet or less.

16. The method of claim 11, further comprising:
    determining that the personal communication device is inside the vehicle; and
    transmitting the short range message to the point-to-point transceiver only when the personal communication device has crossed the predefined geographic boundary and the personal communication device is inside the vehicle.

17. The method of claim 16, wherein determining that the personal communication device is inside the vehicle comprises:
    pairing the personal communication device with a vehicle computer of the vehicle; and
    determining that the personal communication device is inside the vehicle when the personal communication device has been paired with the vehicle computer.

18. The method of claim 11, further comprising:
receiving a speed of a vehicle;
determine a speed of the personal communication device; and
transmitting the short range message to the point-to-point transceiver only when the personal communication device has crossed the predefined geographic boundary and the speed of the vehicle and the speed of the personal communication device is within a predetermined speed of one another.

19. The method of claim 18, wherein the predetermined speed is 10 miles-per-hour or less.

20. The method of claim 11, further comprising:
in response to determining that the personal communication device has crossed the predefined geographic boundary, and prior to transmitting the short range message to the point-to-point transceiver, displaying a query asking a user to confirm that the user wishes the one or more predetermined, automatic actions to occur;
receiving a response to the query; and
transmitting the short range message to the point-to-point transceiver only when the response indicates that the user desires the one or more predetermined, automatic actions to occur.

* * * * *